Oct. 11, 1938.  H. H. BLAU  2,132,390
DIFFUSING GLASSES
Filed July 3, 1935
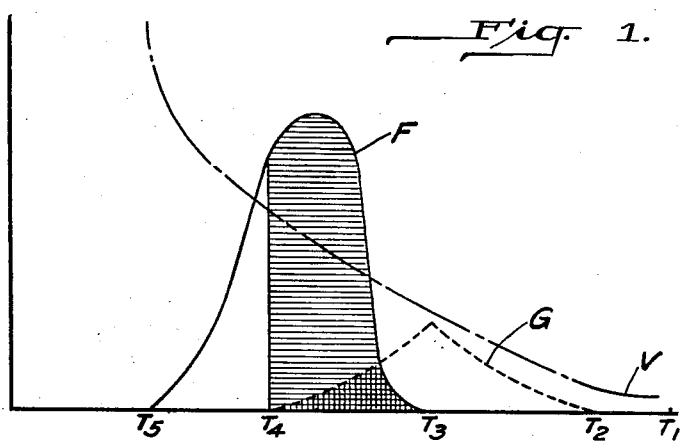
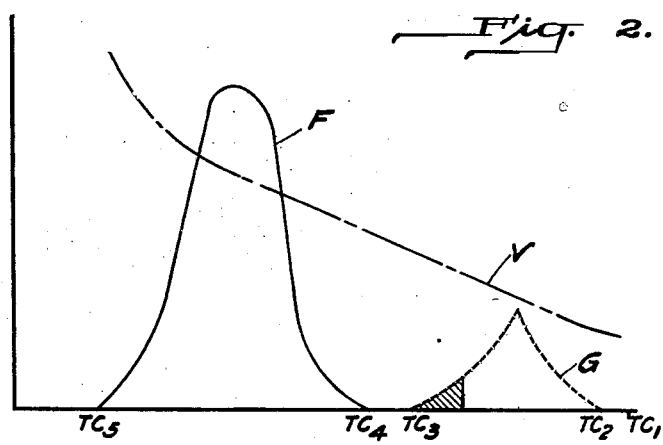
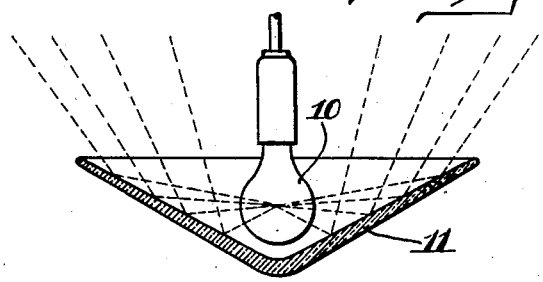

Patented Oct. 11, 1938

2,132,390

UNITED STATES PATENT OFFICE 2,132,390

DIFFUSING GLASSES

Henry H. Blau, Charleroi, Pa., assignor, by mesne assignments, to Corning Glass Works, Corning, N. Y., a corporation of New York Application July 3, 1935, Serial No. 29,709

5 Claims. (Cl. 49—79)

This invention relates to glass articles possessing throughout their entirety uniform characteristics, such as reflecting, transmitting and diffusing properties, examples being lighting bowls, light-enclosing globes, glass tile, and other glass articles in which such characteristics are desirable.

Modern decorating and illuminating standards impose severe requirements on glass articles used in connection therewith, and especially is this true of translucent and diffusing glasses.

These and related problems have arisen or become more difficult to contend with as a result of the progressive development of modern illuminants, and the increasing use of glass associated as an adjunct with light sources. For example, improvements in incandescent lamps and their use in higher wattages call for proper distribution of light for both physiological and aesthetic reasons. Suitable and effective distribution of light from such sources requires the use of modifiers, which commonly take the form of diffusing glasses.

Thus, from the illuminating standpoint, it is sought to provide articles capable of modifying light emanating from a light source in such a way as both efficiently to transmit and reflect the visible radiation and also to minimize surface brilliancy. As to the diffusing properties of such glasses, it is a major desideratum that the article shall be uniform in appearance and color (or absence of color) as viewed by transmitted, or diffused, light, i. e., that it shall be free from irregularities in transmission, reflection and diffusion, which may appear as dark streaks and other undesirable visible nonuniformities due to causes recognized by those skilled in the art.

From the decorative standpoint also, problems have arisen as a result of the increased use of glass, not only for decorative purposes, but also as an aid in illumination, as in the case of glass tiles used for lining vehicular tunnels. From the decorative viewpoint articles formed of translucent glass should combine a pleasing relationship in color as viewed both by reflected and transmitted light, so that under both conditions the articles may harmonize with their surroundings. For example, a light-enclosing bowl or a tile or other article which may be viewed both by reflected and transmitted light should possess desirably related color as viewed both when the light source is and is not in operation.

For the purposes referred to a fundamental property is that of satisfactory reflecting power, and this is true not only in glass articles used with illuminants, but also with those used for other purposes. To obtain satisfactory reflecting power the practices of casing and etching clear glass are in general unsatisfactory, and etched or sand-blasted surfaces are hard to keep clean and are of increased fragility. Cased glasses, as is well known, are likewise subject to disadvantages which militate against them, such as chipping and crazing, and their illuminating efficiencies may be, and commonly are, quite low. Cased glasses are also unsatisfactory for other reasons. Because of the non-homogeneity and widely variant character of the strata pleasing relations between appearance by reflected and transmitted light are not attained with such glasses.

The other mode of causing diffusion is to use opacifying glasses, in which the diffusion is caused by irregularities in internal structure, which avoids the difficulties encountered in etched or cased glasses. But these have not been completely satisfactory for all purposes, and many fields of use, or lighting improvements, have remained undeveloped because of difficulties encountered with opacification phenomena. For example, one type of glasses opacify spontaneously during the formation of the article. These are unsatisfactory for modern purposes because there is little control over the opacification, so that the results either are not uniform or are not reproducible, or because a predetermined result is not obtainable. As to uniformity, it has not been possible successfully and consistently to make pressed articles, for example, globes and bowls from spontaneously opacifying glasses because of the occurrence of so-called flashing rings which form where a metal part contacts with the viscous glass, causing the formation of a ring of increased density to light. In these glasses also the efficiency is not at a maximum because the desired reflection does not take place at the surface and consequently there is absorption of some of the light which encounters the glass.

In my Patent No. 1,778,305 I have disclosed the production of differentially opacified articles. According to the practice of that invention, which operates perfectly satisfactorily for its intended purpose, such articles are formed from glasses which are normally clear but which by heating to a suitable temperature may be rendered diffusing, and only that portion of the formed article which is to be opacified is then subjected to a heating operation to cause it to become opacified. Such glasses are referred to herein as being thermally opacifiable. As described in the patent, the formed article is locally heated at such portion as is to be opacified, preferably by inserting it in an opening in the wall of a gas-fired furnace. Thereby the heated portion of the article becomes opacified, while the remainder of the article remains unaffected.

The method of that patent is well suited to the production of differentially opacified articles. By its nature, however, it involves a rather rapid opacification and hence a rapid growth of the crystallites which cause diffusion. Since diffusing properties are dependent upon the number and size of the crystallites which cause diffusion it will be apprehended that the rapidity of crystal growth renders it difficult to produce exactly controlled predetermined degrees of opacification within the broad limits now needed commercially, i. e., broad variations in proportional relation of diffusing, transmitting and reflecting power.

Furthermore, while the articles made in accordance with the invention of that patent represent a real advance in the art, and are uniform in visual appearance of the opacified portions, it will be seen that they do not completely fulfill all requirements of illuminating glassware because opacification is initiated at and proceeds from the heated surface. Hence the finished article may not be internally of uniform diffusing character, and with such internal non-uniformity the densest part is farthest removed from the light source so that reflection does not occur at the surface, as is desirable. The same thing is true of the other glasses referred to hereinabove. Thus, the spontaneously opacifying glasses are not uniform internally because they are chilled more rapidly at the surface than internally, and therefore in addition to total lack of control of size and number of particles, the opacification does not proceed uniformly so that the diffusion density is not the same at the surface as at the center; this is especially objectionable with tinted glasses.

Therefore, the glasses used heretofore as light modifiers and for decorative purposes have not only suffered from the disadvantages and inherent deficiencies noted, but also they have been of non-uniform internal character, and they have not provided highly efficient reflection at the surface adjacent the light source.

It is a principal object of this invention to provide glass articles which are in their entirety uniformly opacified, possess uniform, predetermined and controlled diffusing, transmitting and reflecting properties, are formed throughout of chemically homogeneous glass, are not subject to deterioration of the kinds encountered with cased or etched glasses, and may be made readily and at relatively low cost.

A further object is to provide glass articles for illuminating purposes, which embody the foregoing properties characteristic of this invention, afford satisfactory illuminating efficiency, and are free from the prejudicial characteristics commonly presented by prior articles used for such purposes.

Another object is to provide glass articles of high reflecting efficiency and in which reflection occurs substantially at the surface.

Yet another object is to provide glass articles having the characteristics referred to from glasses of low fluorine content.

Still another major object is to provide a method of making glass articles for light diffusion which is simple, readily practiced and relatively cheap, by which the diffusing, reflecting and transmitting properties and their relation to one another may be controlled in predetermined and reproducible fashion, which provides articles of uniform internal diffusing character, and which is applicable to both colorless and tinted glasses.

The invention may be described in connection with the accompanying drawing, in which Fig. 1 represents the relations existing between the rate of nuclei formation and the velocity of crystallite growth in a spontaneously opacifiable glass; Fig. 2, a similar graph showing the same relations in a thermally opacifiable glass in accordance with the practice of this invention; and Fig. 3, a view of a lighting unit illustrative of the invention.

Most diffusing glasses owe their properties to inclusions whose indices of refraction are different from those of the surrounding glass matrix. In the case of most diffusing glasses such inclusions are absent from the molten glass in the tank or furnace. At some lower temperature they grow from nuclei which form or are present in the glass. For brevity of reference the terms "nuclei" and "crystallites" as used hereinafter apply to those inclusions which are responsible for the development of diffusing properties in the glasses under consideration.

In accordance with the present invention the number of nuclei and the size of the inclusions, or crystallites, grown therefrom in a thermally-opacifiable glass are controlled to produce diffusing glass articles of definite and controlled light-modifying characteristics and of substantially uniform properties throughout, both visually and in internal diffusing properties. In other words, I have discovered how to control the number and size of the crystallites, and by the application of the control afforded by the process of this invention the diffusing, transmitting and reflecting properties, and their relation to one another, may be varied to produce desired results while obtaining diffusing properties substantially uniform internally of the article throughout its mass. Not only are the properties thus susceptible of desired control, but they are uniform in the article in its entirety and are reproducible. Thus it is commercially practicable through the practice of this invention to provide diffusing glass articles with characteristics appropriate to their intended purpose, the control afforded being such as to permit satisfactory production of predetermined characteristics fitted to the various uses to which such articles are to be put.

In the practice of this invention the glass article is formed, as by pressing or blowing, from a thermally-opacifiable glass the composition of which is such that the nuclei form and grow in separate temperature ranges, i. e., in which nuclei may form while the glass is at a given range of temperature, but can not grow until they are brought to a different temperature. With the formed article at a temperature appropriate to nuclei formation, a number of nuclei are allowed to form, and thereafter the entire article is brought uniformly to temperatures at which the nuclei grow to diffusing crystallites. The article being at a uniform temperature, the growth is uniform with the production of uniform properties, and by controlling the number of nuclei and the size of the crystallites the properties are controllable at will.

For example, the article being formed from a thermally-opacifiable glass in which the inclusion-forming nuclei form at a temperature, or in a temperature range, below that at which the article is worked, the article is brought to that temperature and held for a time sufficient to produce a desired number of such nuclei, and thereafter it is heated uniformly throughout, most advantageously in a lehr, in the range of crystal growth for a period of time to permit the inclusion-forming nuclei to grow to a predetermined size. From this it will be seen that by the practice of this invention it is possible to provide a large or a small number of nuclei and cause them to grow slightly or extensively, or to produce all manners of variation between such limits (i. e., the number of crystallites per unit of volume, and their dimensions), whereby the light-modifying properties are controllable at will to vary the diffusing character, the reflecting power, the transmissivity, appearance, and the like.

By the expression "thermally-opacifiable glass" as used herein I have reference to a glass which is normally clear or semi-diffusing, but which may be rendered diffusing by a suitable operation as just described. Also, the word "predetermined" as used with reference to the nuclei number and crystallite size has reference more particularly to the amount and size as conditioned by the temperatures and lengths of exposures for a given glass, rather than to values known in absolute terms.

The invention may be further described with reference to Figs. 1 and 2, in both of which the curve F represents the field of nuclei formation, curve G that of nuclei growth to form crystallites, and curve V the viscosity, the ordinates increasing in magnitude upwardly from the base for each factor considered. In Fig. 1, which represents the relations in a glass which opacifies spontaneously upon cooling, the glass is withdrawn from the furnace at a relatively high temperature, such as $T_1$, in which condition it is transparent because all of its constituents are in solution. Nuclei grow within the temperature interval $T_2$–$T_4$, representing the limits of curve G, and crystalline nuclei form only within the temperature range $T_3$–$T_5$, these being the limits of the curve F. The article remains transparent until cooled to temperature $T_3$ because even though nuclei may grow while it cools from $T_2$ to $T_3$, no nuclei can form until the article reaches the temperature $T_3$, so that up to that point it is barren of the nuclei necessary for the formation and growth of crystals. But as the article cools from temperature $T_3$ to $T_4$, nuclei form and because the two ranges overlap, crystalline growth occurs simultaneously, thus necessarily causing the glass to opacify. Below a temperature such as $T_4$ no further material crystallization occurs because the viscosity of the glass, as indicated by curve V, has become so great as to oppose further changes in diffusing properties other than those which result from the variations due to changes in refractive index with changes in temperature.

It will be seen that in such a glass the conditions are fixed by the overlapping relationship of the temperature ranges within which nuclei form and crystals grow, so that there is no control of the properties of the resultant article. Thus, the entire area below curve F between $T_3$ and $T_4$ is proportional to the number of crystals present per unit volume of the glass, while the cross-hatched area is an indication of the maximum crystal size. But because nuclei are continuously forming and growing simultaneously the crystals are of random size, and accordingly it is not possible to control the results.

In the practice of the present invention there is used a glass in which these two temperature ranges are separated, as shown in Fig. 2. The glass is withdrawn from the furnace at temperature $TC_1$, and the article is formed. No crystal growth occurs upon cooling through the temperature range $TC_2$ to $TC_3$ because crystal nuclei do not form until the temperature $TC_4$ is reached. The number of nuclei formed upon cooling will depend both upon the temperature to which the article is exposed within the range $TC_4$–$TC_5$, as well as upon the length of such exposure. Thus, at the temperatures closely adjacent to $TC_4$ the nuclei form at a relatively low rate, while toward the middle of the interval, indicated by the peak of curve F, the nuclei form in large numbers at a high rate.

The appropriate number of nuclei having been formed, the article is reheated uniformly and in its entirety to bring it within the range $TC_3$–$TC_2$, where crystal growth can occur, and again the extent of such growth is dependent upon the temperature and time of exposure. Since the nuclei are completely formed prior to initiation of growth, the resultant crystals are of uniform and definite size, in contrast to the wide range of sizes obtained in the spontaneously opacifying glass described in connection with Fig. 1. Thus it will be seen that the invention affords a particularly satisfactory solution of the problem confronting illuminating and decorating experts because the articles produced in accordance with the invention possess uniform, predetermined, and reproducible diffusing, transmitting and reflecting properties which are controllable in a definite manner to provide wide variations therein with control of the result.

Most suitably the crystallites are grown by soaking the article at relatively low temperatures, e. g., not over about 1300° F., as in a lehr. This provides relatively slow reheating which is advantageous in obtaining uniformity of properties, especially uniformity of internal diffusing properties, thereby avoiding the lack of internal uniformity that has characterized prior diffusing glass articles.

The invention is particularly applicable to the manufacture of pressed ware, although it is not restricted thereto, its chief advantage residing in the ability to control and reproduce the uniformity of result desired, as described hereinbefore. This makes it possible to produce satisfactorily uniform dense opal glass articles by pressing operations, which has not been practicable heretofore. As an example, the invention has been applied satisfactorily to the production of semi-indirect lighting bowls having high illuminating efficiencies with extremely low brightness when used with high-wattage lamps mounted at small distances from the glass surface. Thus, with a 300-watt incandescent lamp 10 mounted as shown at a distance of one-half inch from the wall of a bowl 11 of the form shown in Fig. 3 and made in accordance with this invention, the maximum surface brightness was but 2.2 candles per square inch although the over-all lighting efficiency, as measured in accordance with standard practice, was 92 per cent, which is exceptionally high for such units. In addition, tests showed that the distribution of light in the upper hemisphere was eight times that in the lower hemisphere, which relation is highly desirable in obtaining uniform illumination. Moreover, the bowl was of satisfactorily uniform appearance. Such results are not feasible with spontaneously opacifying glasses, and bowls of this type normally are subject to rings of varying opacity if made by pressing procedures in accordance with practice prior to this invention. For such reasons prior pressed bowls of this type could not meet exacting requirements.

The method provided by this invention provides for the production of controlled opal glasses in which the number and average size of the diffusing particles is substantially uniform throughout the glass, i. e., both at and near the surface as well as internally, so that the glass not only has superior technical properties but is of decidedly whiter appearance than heretofore, as well as being of decidedly improved illuminating character and efficiency, particularly reflecting efficiency, as compared with prior practice. The significance of this may be realized when it is understood that with articles made from spontaneous opal glasses heat is withdrawn from the surfaces more rapidly than from the interior, so that the surfaces are lower in light diffusion and reflection than the internal portions. Hence light penetrates fairly deeply into the glass with resultant absorption and decrease in coefficient of reflection. Especially is this true of pressed ware, where the mould and plunger contact areas enhance these prejudicial factors.

This is further significant because the high reflecting efficiency of the products of this invention permits the use of very low concentrations of fluorides. Heretofore it has been necessary to use relatively high concentrations of opacifying agents in making highly reflecting glasses, to produce the necessary dense concentration of opacifying inclusions. This involves both the direct expense of such materials and also the indirect expense arising from corrosion of refractories and moulds. In the practice of this invention much lower concentrations of fluorides may be used, e. g., less than 3 per cent, while obtaining very high coefficients of reflection, e. g., in excess of about 65 per cent. Lower concentrations suffice here because the particles may be caused to grow sufficiently and are distributed uniformly, thus giving this beneficial result, and such lower concentrations decrease the direct cost of the glass, by reducing the cost of ingredients, and the indirect cost arising from attack of refractories, metal parts and the like.

Nor is high reflecting ability at the surface attained at the expense of other properties. Thus, surface reflection can be had by casing, but thereby pleasing relations of color by transmitted and reflected light are attainable with difficulty, if at all. The products of this invention, however, are of uniform internal diffusing character throughout their section, or mass, and hence desired color relationships are obtainable without incurring the disadvantages which accrue from high surface concentration of diffusing particles.

Although the invention is applicable particularly to the production of white, or colorless, diffusing glasses, it is of particular significance as applied to the production of colored or tinted opal glasses, in which it shows outstanding results in the production of desired relations of color or tint as viewed by reflected and transmitted light while combining high illuminating efficiencies.

This aspect of the invention is important both for the production of light globes and the like, as well as for tile and other articles which may be viewed either by reflected or by transmitted light, or both. Heretofore the production of satisfactory tinted diffusing glasses has presented serious obstacles because of the lack of uniformity in size and distribution of the crystallites, which has rendered non-uniformities even more prominent and more displeasing than in the case of colorless opals. Such difficulties are avoided by the method of this invention, whereby, as described hereinabove, uniformity is satisfactorily realizable, and color tones may be varied by varying the heat treatment steps embodied in this method.

An important feature of the invention is that it permits the development of diffusing properties at relatively low temperatures so that the diffusing properties may be controlled without deformation of the article. This is particularly important in connection with tinted glasses, as for conferring a desired or uniform color saturation. Most spontaneous opal glasses, on the other hand, acquire their diffusing properties at relatively high temperatures at which they are highly fluid, and therefore at which they are easily deformed. A further advantage is that the articles can be completely annealed without affecting their light-modifying characteristics.

Various modifications of the practice of the invention are possible. Thus, the formed article may be cooled to cause formation of the desired number of nuclei, and immediately reheated to cause their controlled growth. Or, having formed the article and the nuclei, it may be cooled, even to room temperature and thereafter reheated to cause the nuclei to grow. Still another possibility is to anneal after the nuclei have been formed, and thereafter heat-treat for growth. Such annealing operations are conducted in accordance with normal practice and do not interfere with the operations of this method, the annealing and heat-treatment steps being virtually independent.

For production of articles of uniform appearance it is necessary, as indicated hereinabove, that temperature differentials in the article be avoided in the steps of nuclei formation and growth. Hence it is preferred that the heat-treating steps be conducted in lehrs. This is also in distinction to my aforesaid patent, the method of which is dependent upon establishment of temperature differentials, using, preferably, rapid, radiation heating of varying proximities and intensities.

As illustrative of compositions utilizable in the practice of the invention reference may be made to the following batch:

| | Parts by Weight |
|---|---|
| Sand | 1045 |
| Soda ash | 315 |
| Nitre | 37 |
| Feldspar | 665 |
| Litharge | 190 |
| Arsenic | 8 |
| Sodium silicofluoride | 75 |

The glass may suitably be melted for 28 to 35 hours at about 2625° F. The articles are formed from it and cooled to about 900° to 800° F., in which range the inclusion-forming nuclei are developed, the temperature and length of exposure being dependent upon conditions fully set forth hereinabove. Thereafter the article is heated, as in a lehr, at about 1040° to 1080° F. for, say, up to two and one-half hours, to cause the nuclei to grow to the desired size and develop the desired diffusing properties.

It will be observed that the control provided by the method of this invention affords means for readily determining the reflection, transmission and/or absorption characteristics of the article for all ranges of wave length, in both the visible and the invisible spectrum. Hence an important field of applicability lies in the production of articles having desired transmission characteristics in the infra-red and ultra-violet wave lengths. For instance, the number and size of particles might be selected to cause reflection of infra-red rays, thus reducing their transmission by the glass with avoidance of heating, which is desirable in connection with lighting devices used with high-wattage lamps.

Or, the particle size can be such that the scattering of visible and ultra-violet waves are of essentially the same order of magnitude, thereby obtaining high ultra-violet transmission. This is in contrast to spontaneous opal glasses which show higher scattering of ultra-violet and higher transmission loss of such waves.

Still another possibility is that of correlating conditions, by control of particle character in accordance with the invention, to provide for scattering of visible light and transmission of infra-red waves. As applied to baking articles this combination provides high heating efficiency with concealment of the scorching or burning which often occurs at the glass surface and which is aesthetically undesirable.

Other possibilities will occur to those skilled in the art.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. That method of manufacturing a diffusing glass article having controlled light-modifying characteristics and internally uniform diffusing properties which comprises forming the article in its entirety from a thermally-opacifiable chemically homogeneous glass the composition of which is such that the light-diffusing inclusions form and grow in separated temperature ranges, causing the formation of a controlled number of inclusion-forming nuclei uniformly distributed throughout the article, and reheating the entire article uniformly to a temperature and for a time to cause the said nuclei to grow to definite and controlled dimensions, and thereby controlling the number and size of diffusing inclusions and causing the article to have throughout uniform internal diffusing properties and controlled, definite and predetermined light-modifying characteristics.

2. That method of manufacturing a diffusing glass article having controlled light-modifying characteristics which comprises forming the article in its entirety from a thermally-opacifiable chemically homogeneous glass the composition of which is such that the diffusing inclusions form and grow in separated temperature ranges and such that said inclusions form at a temperature below that at which the article is formed, bringing the formed article to a temperature and for a time to produce a controlled number of inclusion-forming nuclei uniformly distributed throughout the article, and subsequently reheating the entire article uniformly to a temperature and for a time to cause said nuclei to grow to definite and controlled dimensions, and thereby controllably regulating the number and size of the inclusions and causing the article to be throughout of uniform internal diffusing properties and to have controlled, definite and predetermined light-modifying characteristics.

3. That method of manufacturing an opacified glass article having controlled light-modifying characteristics which comprises forming the article in its entirety from a thermally-opacifiable chemically homogeneous glass the composition of which is such that the opacifying inclusions form and grow in separated temperature ranges and such that the inclusion-forming nuclei form at a temperature below that at which the article is formed, cooling the formed article uniformly to a temperature at which said nuclei form and holding it there for a time to produce a controlled number of said nuclei uniformly distributed throughout the article, and reheating the entire article uniformly to a temperature and for a time to cause said nuclei to grow to definite and controlled dimensions, and thereby controllably regulating the number and average size of opacifying inclusions and causing the article to be uniformly opacified throughout and to have controlled definite and predetermined light-modifying characteristics.

4. A method according to claim 1, the glass containing a tinting constituent.

5. A method according to claim 3, the glass containing a tinting constituent.

HENRY H. BLAU.